United States Patent [19]

Sergenius

[11] Patent Number: 5,628,120
[45] Date of Patent: May 13, 1997

[54] METHOD FOR THE MEASUREMENT OF LENGTHS AND ANGLES AND AN EQUIPMENT THEREFOR

[76] Inventor: Jan G. Sergenius, Bergsundsgatan 15, S-117 37, Stockholm, Sweden

[21] Appl. No.: 500,921

[22] PCT Filed: Feb. 15, 1994

[86] PCT No.: PCT/SE94/00121

§ 371 Date: Jul. 31, 1995

§ 102(e) Date: Jul. 31, 1995

[87] PCT Pub. No.: WO94/19663

PCT Pub. Date: Sep. 1, 1994

[30] Foreign Application Priority Data

Feb. 16, 1993 [SE] Sweden .................. 9300508

[51] Int. Cl.$^6$ .............. G01B 3/10; G01B 7/14
[52] U.S. Cl. .................. 33/763; 33/771; 33/708
[58] Field of Search ................. 33/771, 762, 763, 33/706, 707, 708

[56] References Cited

U.S. PATENT DOCUMENTS

| | | | |
|---|---|---|---|
| 2,875,524 | 3/1959 | Bower et al. | 33/708 |
| 3,029,518 | 4/1962 | Raymond et al. | 33/708 |
| 4,226,024 | 10/1980 | Westerberg et al. | |
| 4,658,134 | 4/1987 | Okumura | 33/762 |
| 4,747,215 | 5/1988 | Waikas | 33/763 |
| 4,926,566 | 5/1990 | McMurtry et al. | 33/706 |
| 5,174,041 | 12/1992 | Lorenz | 33/708 |

FOREIGN PATENT DOCUMENTS

| | | | |
|---|---|---|---|
| 550235 | 12/1959 | Belgium | 33/708 |
| 0191223 | 8/1986 | European Pat. Off. | |
| 455613 | 11/1991 | European Pat. Off. | 33/708 |
| 3902887 | 8/1989 | Germany | 33/708 |
| 131416 | 7/1985 | Japan | 33/763 |
| 1448036 | 12/1988 | U.S.S.R. | 33/708 |
| 2205406 | 12/1988 | United Kingdom | 33/708 |
| 85/00220 | 1/1985 | WIPO | |

*Primary Examiner*—Thomas B. Will
*Attorney, Agent, or Firm*—Griffin, Butler, Whisenhunt & Kurtossy

[57] ABSTRACT

The invention relates to a method and to an arrangement for measuring length or angles, in which method use is made of a tape-shaped transmitter element (1) which is provided with markings and is designed to be pulled out of and pushed into a housing (6), easing or the like, the latter being provided with at least one sensor (4, 5) for detecting the markings on the transmitter element, and with an electronics unit (33) for converting signals from the sensor into length measurements or angle measurements. The sensor detects the markings on the transmitter element, which markings are in the form of embossings (2) in a repeated pattern of embossings, which form a micro-corrugated, ribbon-shaped zone (3) on the transmitter element, which micro-corrugated zone is moved past the sensor which registers and counts the number of elevations and/or depressions in the micro-corrugated zone, which elevations and/or depressions pass the sensor from a certain starting position to a certain measurement point, which is converted in the electronics unit to a measurement value of the length or angle in question.

7 Claims, 2 Drawing Sheets

METHOD FOR THE MEASUREMENT OF LENGTHS AND ANGLES AND AN EQUIPMENT THEREFOR

TECHNICAL FIELD

The present invention relates to a method for measuring length or angles, in which method use is made of a tape-shaped transmitter element which is provided with markings and is designed to be pulled out of and pushed into a housing, casing or the like, the latter being provided with at least one sensor for detecting the markings on the transmitter element, and with an electronics unit for converting signals from the sensor into length measurements or angle measurements. The invention also relates to equipment for carrying out the method.

PRIOR ART

It is generally known to use markings of a magnetic nature on the transmitter unit of equipment of the abovementioned type. U.S. Pat. No. 4,747,215 describes electronic measuring equipment which comprises a measuring tape with a builtin magnetic strip on which magnetic markings have been recorded, which markings can transmit signals to a sensor in a tape housing. A measuring tape of this type has a number of particular disadvantages. Among these may be mentioned the fact that the magnetic strip has to be embedded in the measuring tape so that the strip is mechanically protected. This is complicated and considerably increases the cost of the product. Nevertheless, there is still a risk of the strip being damaged mechanically. Moreover, in all equipment based on permanent magnetic markings, there is a risk that the markings will be lost or will be altered as a result of demagnetization.

U.S. Pat. No. 4,316,081 is also based on permanent magnetic markings in a measuring tape. In this case the markings are in the form of magnetic spheres arranged at a certain distance from one another. A disadvantage of this measuring equipment is that the degree of resolution is relatively small. In addition, there is a risk of demagnetization in this case too.

It is also known to use magnetoresistive conditions in order to measure lengths or positions. Examples of this technique are described in U.S. Pat. Nos. 4,712,064, 4,612,502, 4,039,936, 4,731,580, 4,053,829, in GB 2 157 831 and in EP-B-0 164 832.

BRIEF DISCLOSURE OF THE INVENTION

An object of the invention is to offer a method and equipment of the type specified in the preamble, which does not presuppose the use of any permanent magnetic markings in the transmitter element. A particular aim of the invention is to offer equipment having a transmitter element which is designed in such a way that it is adapted to magnetoresistive measurement, without markings of a permanent magnetic nature in the transmitter element, which does not, however, preclude the possibility of detection other than magnetoresistive detection being included within the scope of the invention. For example, laser detection or other optical detection of the markings on the transmitter element is conceivable.

A further aim of the invention is to offer a transmitter element which can be massproduced at very low cost and which, in combination with suitable electronics, can nevertheless permit an extraordinarily high degree of resolution and corresponding accuracy of measurement.

BRIEF DESCRIPTION OF THE FIGURES

In the following description of a preferred embodiment, reference will be made to the attached drawings, in which.

DESCRIPTION OF A PREFERRED EMBODIMENT

Figure 1:
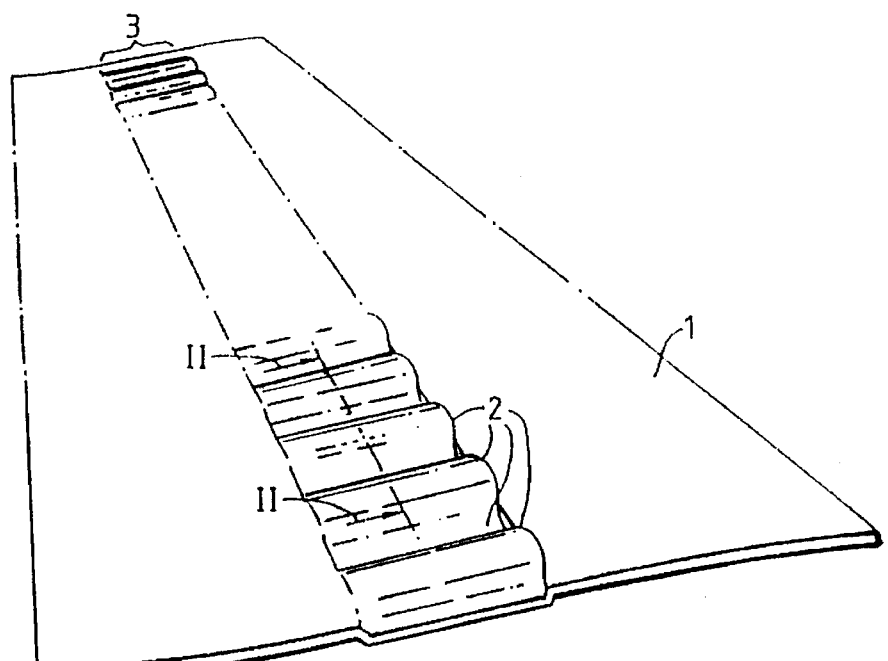
FIG. 1 is a perspective view of a part of a transmitter element in the form of a measuring tape.
Figure 2:
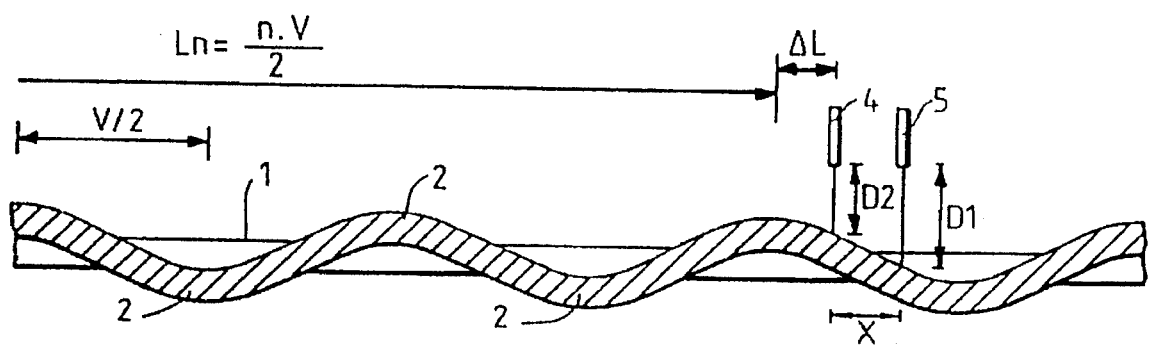
FIG. 2 shows, schematically, the principle of the measuring technique, with a part of the tape being shown on a larger scale in a longitudinal section through II—II in FIG. 1.
Figure 3:
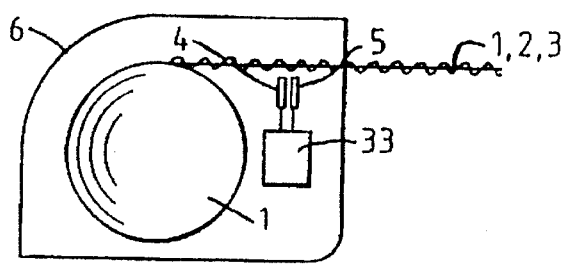
FIG. 3 shows, schematically, the main components of the equipment.

In FIGS. 1–3 a measuring tape is generally designated by the reference 1. It consists of coldrolled carbon steel, i.e. a ferromagnetic, but not magnetized, material. The tape 1 has a width which is normal for measuring tapes, i.e. about 15 mm, and a thickness of about 0.12 mm. According to the embodiment, the tape has an S-shaped cross-section, which gives good flexural strength. Among other possible forms, a conventionally curved form may be mentioned, and a completely flat basic form of the tape 1 is also conceivable. It is also possible to imagine the surfaces, which are situated on either side of the central zone, being provided with an embossed pattern which further improves the flexural strength.

The feature particular to the invention is that the tape 1 has been provided with markings in the form of a repeated pattern of embossings 2 which form a microcorrugated, ribbon-shaped zone 3 on the transmitter element 1, which micro-corrugated zone 3 is intended to be moved past at least one sensor (in the preferably chosen embodiment of the electronics there are two sensors 4, 5) in a tape housing 6 or the like during measurement. An electronics unit has been designated by 33. According to the embodiment, the transmitter element is in the form of a tape curved in this case, which can apply in particular to equipment for angle measurement.

The embossings 2 in the zone 3 have a depth which, in the case of the tape thickness in question, is at least 0.05 and at most 1 mm. The depth of embossing is expediently of the same order of size as the tape thickness. As emerges most clearly from FIG. 1 and FIG. 2, the embossings 2 form regularly alternating elevations (peaks) and depressions (valleys) in a continuous wave shape in the longitudinal direction of the zone 3. The distinctive feature of this wave shape is that it has regularly recurring maxima (peaks) and minima (valleys), and that the inclination of the wave curve at all points between these maxima and minima forms an angle with respect to both the horizontal direction and the vertical direction. For example, the embossed pattern can have the form of a sinusoid curve, or a curve which resembles a sinusoid curve. The length of the wave V is, in the case of the tape thickness in question, at least 0.5 mm and at most 5 mm. A suitable length of the wave is about 10 times the thickness of the tape, or about 1 mm. The width of the zone 3 does not constitute a critical dimension, but it should be comparatively small so as not to affect seriously the flexural strength of the tape 1. A suitable zone width is 1–4 mm, expediently about 2 mm. The embossings 2 in the zone 3 are produced by rolling while the tape 1 is otherwise being given the desired profile.

Since the transmitter element is represented by a measuring tape 1, the demands in respect of accuracy of measurement are generally moderate. It suffices in these cases to count, with the aid of the sensor or the sensors 4, 5, the number of embossings, or, more specifically, to record the number of maxima and minima in the curve pattern of the embossing 2, or, if appropriate, only the maxima (the peaks) or only the minima (the valleys) which pass by the sensor/sensors when the tape is being moved into or out of the tape housing 6. The sensor/sensors is/are preferably of the magnetoresistive type. The impulses from the maxima and/or minima are converted in the electronics unit to mm or inches, which are read off on a liquid crystal digital display.

How the measurement proceeds for higher, or very high, demands in respect of accuracy of measurement will now be explained in greater detail with reference also to FIG. 4, and at the same time the electronics equipment will be described in greater detail. The basic principle of the measurement technique is that the signals from two differential magnetoresistive sensors 4, 5 are detected. These signals, which correspond to logged maxima and minima in the curve pattern of the embossing, are converted to pulses and counted. At positions between the said maxima and minima in the curve pattern, incremental or decremental calculation is also carried out by deter-mining the individual resistances of the sensor. The aggregate values are shown on a liquid crystal digital display 8 in millimeters or inches.

Figure 4:
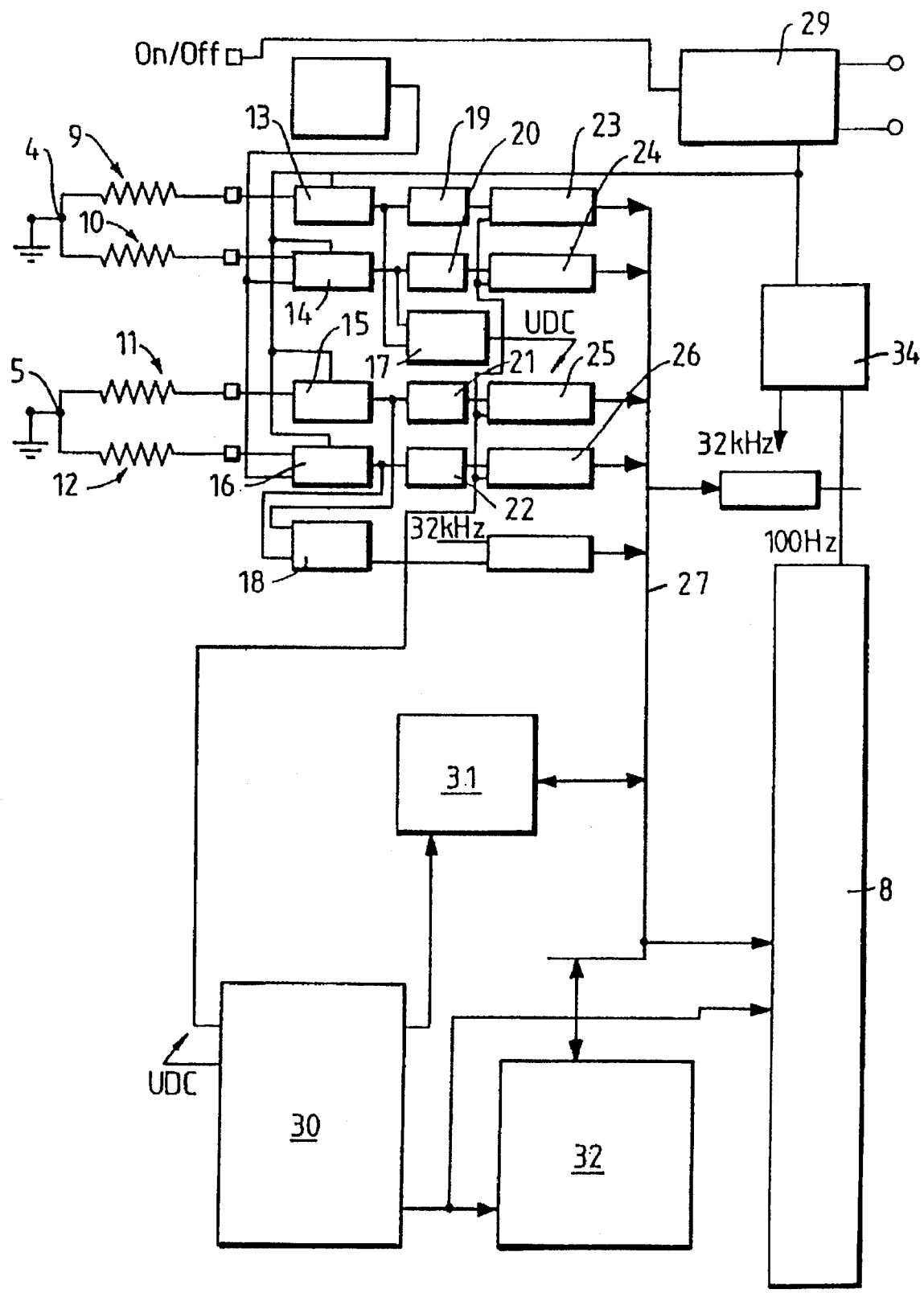
FIG. 4 shows the electronic components of the equipment in the form of a block diagram.

In the block diagram shown in FIG. 4, references 9, 10 denote inputs from the differential sensor 4, while references 11, 12 denote inputs from the differential sensor 5. These inputs are connected to R/I converters 13–16, where the varying resistances of the respective sensors are converted to current values. In pulse generators 17, 18, socalled comparators, the currents from the R/I converters are compared, and a high or low signal is emitted depending on which input is higher than the other. The oscillators 19–22 are controlled from the R/I converters and give a frequency which is proportional to the input current. The actual frequency of each channel is calculated by a counter 23–26 connected to the internal data bus 27. In addition, the counter is read off and reset to zero at regular intervals, this being carried out with the aid of a crystal functioning at a frequency of 32 kHz in the unit 34. The time between two counted pulses is also calculated in a counter which is connected to the internal data bus. According to the embodiment, an oscillator functions with a crystal which emits 32 kHz. A voltage control 29 controls the voltage to the units which have been described.

The electronic equipment furthermore comprises a control unit 30, an arithmetic logic unit (ALU) 31 and a storage unit 32. How the various units are coupled can be seen from the block diagram in FIG. 4. Information relating to the form of the wave pattern in the embossed zone 3 is stored in the storage unit. Information is also available relating to the distance X between the two differential magnetoresistive sensors 4 and 5. This distance X is less than half the length of a wave V/2. In addition to the said maxima and minima of the resistance, which correspond to maxima and minima in the wave pattern, measurements of the distances D1 and D2, respectively, to the tape in the embossed zone 3 are obtained in digital form. According to the program which has been loaded, the incoming signals are treated incrementally or decrementally in a digital manner, so that an adjustment value DL is obtained which is added to the approximative measurement value Ln, which corresponds to a certain number n of half wave lengths, so that a measurement value Ln+DL corresponding to a certain number of pulses is obtained which is converted to millimeters or inches and can be read off on the digital display 8.

Despite the relatively large division between the teeth (the length of the wave) in the embossed pattern in the zone 3, it is possible to obtain a degree of resolution and a precision of measurement of the order of 5–10 µm, which is made possible by the micro-corrugation and the continuous wave form of the embossed pattern, in combination with the magnetoresistive measurement technique.

I claim:

1. In a method for measuring length which utilizes a measuring tape, at least one sensor, and an electronic unit housed in a casing, from which the tape can be pulled out of and pushed into or be displaced relatively to it, comprising the steps of:

a) forming the measuring tape from a ferromagnetic, but not magnetized, material, and b) forming on the tape a ribbon-shaped zone with corrugations comprised of a repeated pattern of embossings, including depressions and elevations, wherein the embossings depth is at least 0.05 mm, and wherein the repeated pattern of embossings form a continuous wave shape in the longitudinal direction of the tape, c) passing the tape by said at least one sensor, the sensor being a magnetoresistive sensor adapted to magnetoresistive measurement, and d) providing the magnetoresistive measurements to the electronic unit to convert signals from the sensor into length measurements, whereby the sensor registers the numbers of depressions and elevations in the ribbon-shaped corrugated zone.

2. Method according to claim 1, wherein the tape is moved passed two differential magnetoresistive sensors, spaced apart from one another.

3. Apparatus for measuring length, comprising a measuring tape having two longitudinal, parallel side edges, a casing for the measuring tape which can be pulled out of and pushed into the casing or be displaced relative thereto, markings on the measuring tape, at least one sensor in the casing for detecting the markings on the measuring tape, and an electronics unit in the casing for converting signals from said sensor in to length measurements, wherein a) the measuring tape has a thickness of at least 0.05 and at most 1 mm;

b) the body of the measuring tape, within a ribbon shaped zone of the measuring tape, said zone extending between and parallel to and at a distance from the side edges of the measuring tape, is corrugated to form said markings consisting of a repeated pattern of embossings, including depressions and elevations in the form of transverse ridges and valleys on both sides of the measuring tape in said ribbon-shaped zone;

c) the measuring tape on both sides of said ribbon-shaped corrugated zone, between the ribbon-shaped corrugated zone and the side edges of the measuring tape, has at least one zone which is void of corrugations having transverse ridges and valleys;

d) the embossings have a depth of at least 0.05 mm;

e) the repeated pattern of embossings forming a continuous wave shape in the longitudinal direction of the ribbon-shaped corrugated zone, the length of the wave being at least 0.5 mm;

f) the measuring tape being at least substantially made of a ferromagnetic, but not magnetized, material;

g) and said at least one sensor is a magnetoresistive sensor provided to register the number of at least one of said type of embossings as said embossings pass the sensor from a certain starting position to a certain measuring point when the measuring tape is moved relative to the at least one sensor.

4. Apparatus according to claim 3, wherein the at least one sensor comprises two differential magnetoresistive sensors that are arranged at a certain distance from each other along the ribbon-shaped corrugated zone and wherein the electronics unit comprises a storage unit which contains information on the embossed pattern in the ribbon-shaped corrugated zone and also information on the distance between the sensors.

5. Apparatus according to claim 3, wherein the ribbon-shaped corrugated zone has a width of between 1–4 mm.

6. Apparatus according to claim 3, wherein the embossing depth is at most 1 mm.

7. Apparatus according to claim 3, wherein the wave length is at most 5 mm.

* * * * *